United States Patent
Hsu

(10) Patent No.: US 7,329,134 B2
(45) Date of Patent: Feb. 12, 2008

(54) ELECTRICAL CONNECTOR

(75) Inventor: Chang-Shin Hsu, Tu-cheng (TW)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 0 days.

(21) Appl. No.: 11/504,336

(22) Filed: Aug. 15, 2006

(65) Prior Publication Data

US 2007/0037439 A1 Feb. 15, 2007

(30) Foreign Application Priority Data

Aug. 15, 2005 (CN) .................. 2005 2 0074619

(51) Int. Cl.
*H01R 13/62* (2006.01)
(52) U.S. Cl. .................................... 439/159
(58) Field of Classification Search ............... 439/157, 439/159, 160
See application file for complete search history.

(56) References Cited

U.S. PATENT DOCUMENTS

| | | | |
|---|---|---|---|
| 6,394,827 B2 * | 5/2002 | Nogami | 439/159 |
| 6,846,192 B2 * | 1/2005 | Tien | 439/159 |
| 6,966,786 B1 * | 11/2005 | Motojima et al. | 439/159 |
| 7,070,430 B2 * | 7/2006 | Yang et al. | 439/159 |
| 7,118,395 B2 * | 10/2006 | Tsuji | 439/159 |
| 7,238,034 B2 * | 7/2007 | Matsukawa et al. | 439/159 |
| 2001/0031571 A1 | 10/2001 | Stacey | |
| 2004/0043664 A1 * | 3/2004 | Sato et al. | 439/630 |

* cited by examiner

*Primary Examiner*—Briggitte R. Hammond
(74) *Attorney, Agent, or Firm*—Wei Te Chung

(57) ABSTRACT

An electrical connector (100) used to be mounted on a printed circuit board includes an insulating housing (20) defining a receiving cavity (21) for mating with a complementary component (80), a number of electrical contacts (30) to be soldered to the printed circuit board, an ejecting mechanism assembled to the insulating housing and a metal cover (40) covering the insulating housing (20). The ejecting mechanism includes a slider (60) slidable between a first position and a second position, and a spring (50) for driving the slider to the first position. The metal cover forms a tab (41) at the first position for preventing the slider from moving over the first position under a force that the spring applies to the slider.

9 Claims, 6 Drawing Sheets

ELECTRICAL CONNECTOR

BACKGROUND OF THE INVENTION

1. Field of the Invention

The present invention relates to an electrical connector used to be mounted on a printed circuit board, and more particularly, relates to an electrical connector having a mechanism for ejecting out a complementary component mated in the electrical connector.

2. Description of the Prior Art

A conventional electrical connector having an ejecting mechanism is disclosed in U.S. patent publication No. 2001/0031571 A1, published on Oct. 18, 2001. The electrical connector used to be mounted on a printed circuit board includes a housing with a receiving slot for receiving a card, a plurality of electrical contacts secured in the housing for electrical connecting the card to the printed circuit board, a metal cover for covering the housing, an eject device having a slider movable between a loading position and an insertion position of the card, and a coil spring for biasing the slider outward. The slider is received in a recess portion provided along a side of the housing and is covered by the metal cover. When the card is inserted into the card connector, the slider moves forwardly. When the card is to be ejected, the slider is pushed back to its original position.

In the prior art, the slider of the card connector will be pushed to bias the housing when the card is not inserted therein. When the electrical connector is mounted onto a printed circuit board, the electrical connector needs to be heated up so that the electrical contacts can be soldered to the printed circuit board. However, the housing is usually made of insulating material such as plastic, whose rigidity will much reduce when the housing subjects to a temperature suiting for soldering. Thus, when the electrical connector is heated up for being mounted onto the printed circuit board, the housing will deform and warp under the force applied by the eject device. Subsequently, some of the electrical contacts will rise from the printed circuit board with the warpage of the housing and cannot be steadily soldered to the printed circuit board.

Hence, an improved electrical connector is needed to solve the above problem.

BRIEF SUMMARY OF THE INVENTION

One object of the present invention is to provide an electrical connector with electrical contacts which can be steadily soldered to a printed circuit board.

The present invention provides an electrical connector used to be mounted on a printed circuit board, said electrical connector comprising an insulating housing defining a receiving cavity for mating with a complementary component; a plurality of electrical contacts to be soldered to said printed circuit board; an ejecting mechanism assembled to said insulating housing, said ejecting mechanism comprising a slider for moving between a first position and a second position and a spring applying a force to said slider; a metal cover covering at least a part of said insulating housing, said metal cover forming a tab at the first position for preventing said slider from moving over the first position under the force that the spring applies to the slider.

Other objects, advantages and novel features of the invention will become more apparent from the following detailed description of the present embodiments when taken in conjunction with the accompanying drawings.

BRIEF DESCRIPTION OF THE DRAWINGS

The features of this invention which are believed to be novel are set forth with particularity in the appended claims. The invention, together with its objects and the advantages thereof, may be best understood by reference to the following description taken in conjunction with the accompanying drawings, in which like reference numerals identify like elements in the figures and in which:

DETAILED DESCRIPTION OF THE INVENTION

Figure 1:
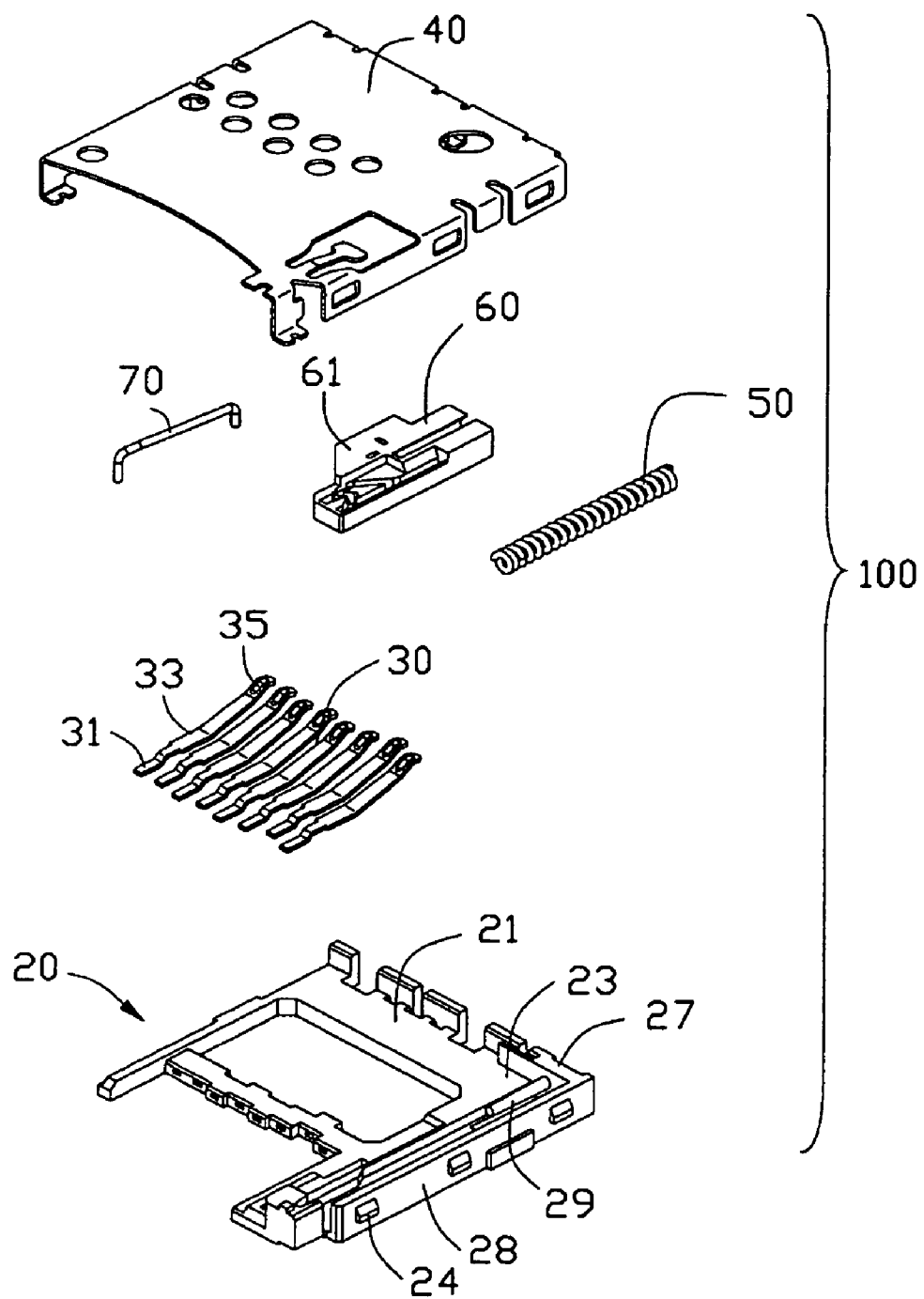
FIG. 1 is an explosive view of an electrical connector in accordance with the present invention.

Reference will now be made to the drawing figures to describe the present invention in detail.

Figure 2:
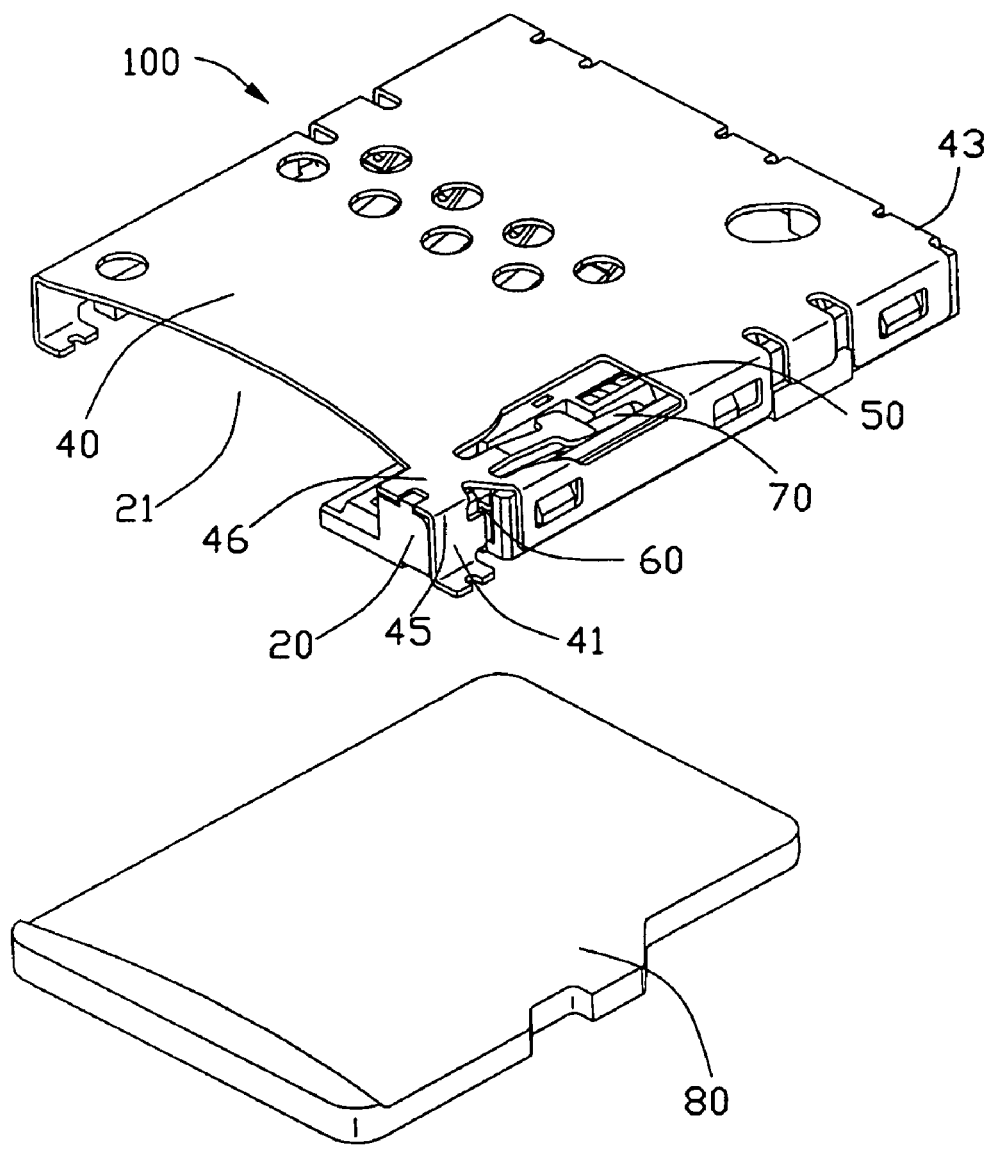
FIG. 2 is a perspective view of the electrical connector of FIG. 1, with a complementary component shown beside.
Figure 3:
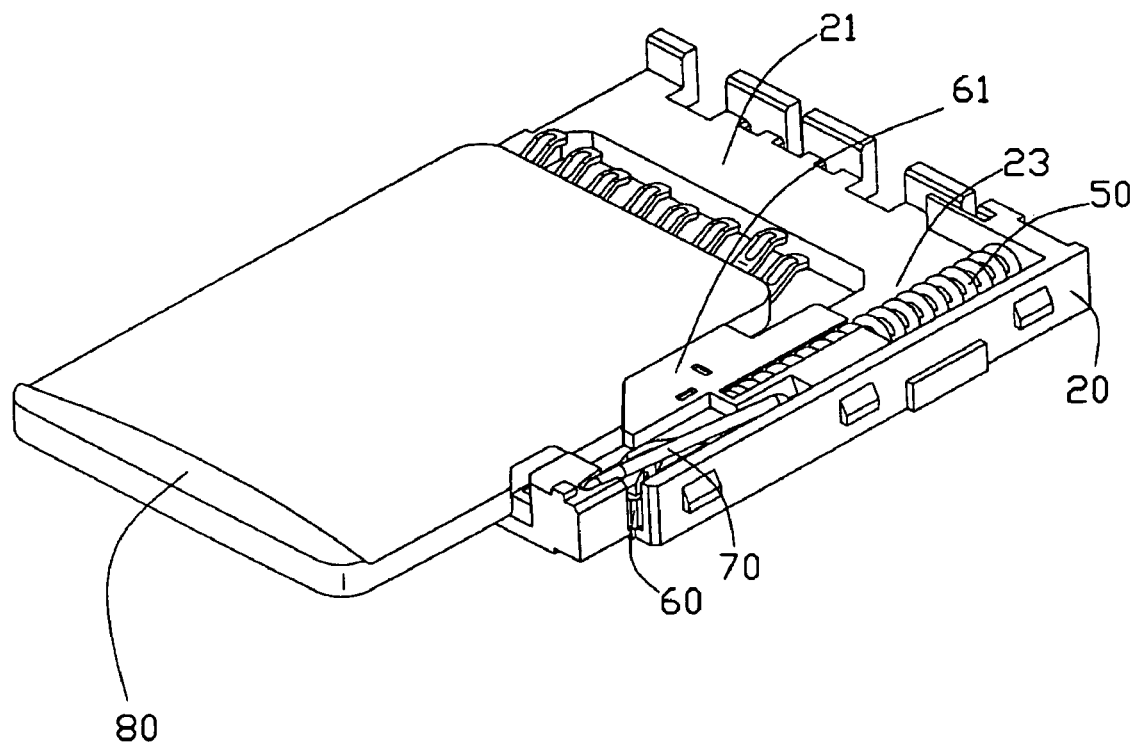
FIG. 3 is a perspective view of the electrical connector of FIG. 2, wherein a metal cover is removed therefrom and the complementary component is partly inserted thereinto.

Referring to FIGS. 1 and 2, an electrical connector 100 used for connecting a complementary component 80 to a printed circuit board is shown. The electrical connector 100 includes an insulating housing 20 defining a receiving cavity 21 for mating with the complementary component 80, a plurality of electrical contacts 30 received in the insulating housing 20, an ejecting mechanism assembled to said insulating housing 20, and a metal cover 40 covering said insulating housing 20.

The housing 20 forms a bottom wall 23, a rear wall 27 and a side wall 28 perpendicularly extending for the bottom wall 23 to define the receiving cavity 21. The rear wall 27 forms a guiding post 29 extending forwardly therefrom, and the guiding post 29 is located near and parallel to the side wall 28.

Each of the electrical contacts 30 includes a securing portion 33 integrally formed in the bottom wall 23 of the insulating housing 20, a tail portion 31 extending from the securing portion 33 to be soldered to the printed circuit board, and a contacting portion 35 extending oppositely to the tail portion 31 from the securing portion 33 into the cavity 21 for contacting the complementary component 80.

Referring to FIGS. 1-5, the ejecting mechanism is a push-push ejecting mechanism assembled to the housing 20 beside the side wall 29. The ejecting mechanism includes a coil spring 50 sheathing the guiding post 29, a slider 60 defining a hole for receiving the coil spring 50 and a following lever 70 for controlling the movement of the slider 60. The slider 60 forms an enlarged portion 61 extending into the cavity 21 for mating with the inserted complementary component 80. Under the push-push operation of the complementary component 80 in the cavity 21 and the assistances of the coil spring 50 and the following lever 70, the slider 60 moves along a sliding line between a first position and a second position. When the slider 60 moves to the first position by the push of the coil spring 50, the slider bring out the complementary component 80.

Figure 4:
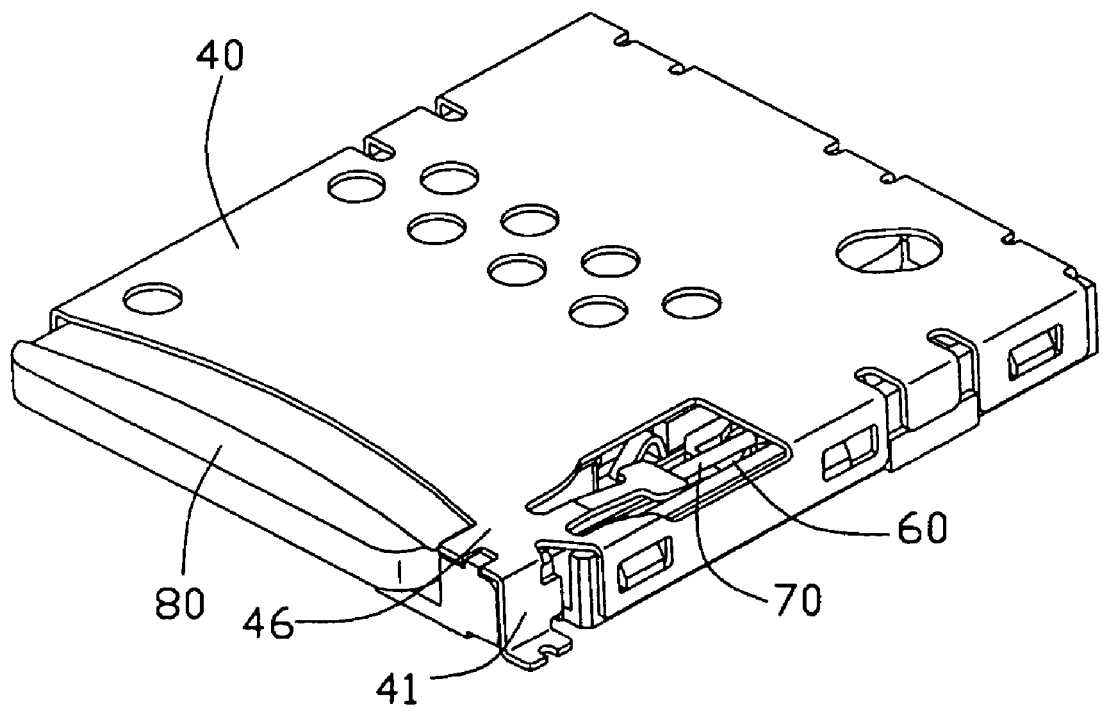
FIG. 4 is a perspective view of the electrical connector with the complementary component being completely inserted thereinto.
Figure 5:
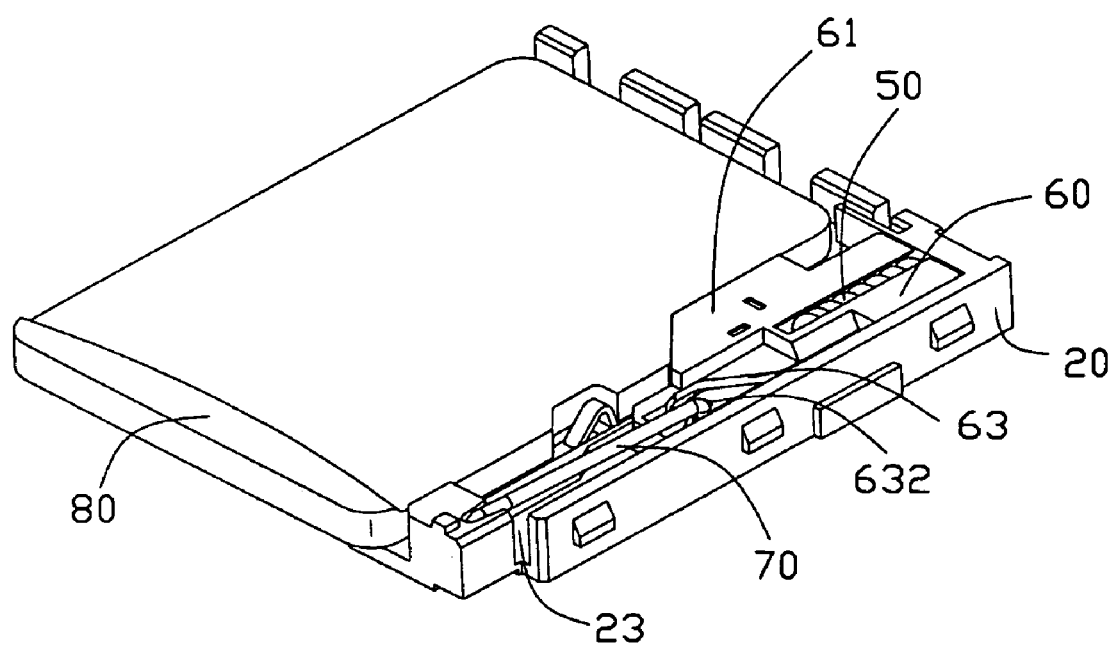
FIG. 5 is a perspective view similar to FIG. 3 except that the complementary component is fully inserted thereinto.
Figure 6:
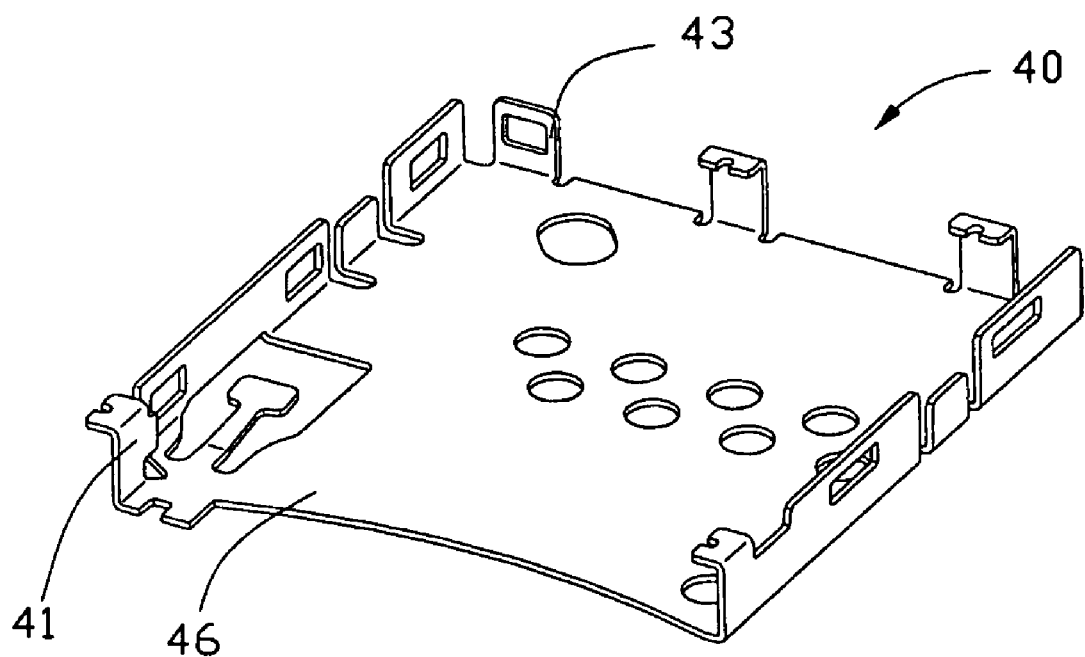
FIG. 6 is a perspective view of the metal cover.

Referring to FIG. 6, the metal cover 40 forms a top wall 46 and a number of latch arms 43 for mating with corresponding number of latch blocks 24 protruding from a circumference of the housing 20. Referring to FIGS. 2 and 4, the metal cover 40 covers over the insulating housing 20 and has a tab 41 bent from the top wall 40 along a line 45 parallel to the sliding direction. The bent portion 41 is located at the first position and the slider 60 is abutting the bent portion 41 when the complementary component is unmated in the cavity 21.

It is to be understood, however, that even though numerous, characteristics and advantages of the present invention have been set fourth in the foregoing description, together with details of the structure and function of the invention, the disclosed is illustrative only, and changes may be made in detail, especially in matters of number, shape, size, and arrangement of parts within the principles of the invention to the full extent indicated by the broad general meaning of the terms in which the appended claims are expressed.

I claim:

1. An electrical connector for being mounted onto a printed circuit board, the electrical connector comprising:
   an insulating housing defining a receiving cavity for mating with a complementary component;
   a plurality of electrical contacts, each of said electrical contacts having a securing portion for holding said electrical contact in the insulating housing, a contacting portion extending into said receiving cavity and a tail portion;
   an ejecting mechanism assembled to said insulating housing, said ejecting mechanism comprising a slider for moving between a first position and a second position, and a spring applying a force to said slider; and
   a metal cover having a top wall covering at least a part of said insulating housing and a tab bent from said top wall and located behind the first position for biasing said slider to prevent said slider from moving over the first position under the force applied by the spring.

2. The electrical connector according to claim 1, wherein said tab is bent from said top wall along a line parallel to a moving direction of the slider.

3. The electrical connector according to claim 2, wherein said tab has an end soldered to said printed circuit board.

4. The electrical connector according to claim 1, wherein said ejecting mechanism is located near the tail portion of at least one of said electrical contacts.

5. The electrical connector according to claim 1, wherein said slider forms an enlarged portion extending into said cavity for mating with said complementary component.

6. The electrical connector according to claim 1, wherein said ejecting mechanism further comprises a following lever fitting into a heart-shaped guiding slot defined in said slider.

7. The electrical connector according to claim 1, wherein the insulating housing forms a bottom wall and a side wall parallel to an insertion direction of the complementary component, and wherein said ejecting mechanism is arranged near said side wall and the slider is slidable along the side wall.

8. The electrical connector according to claim 1, wherein the insulating housing forms a rear wall abutting said spring, and the metal cover has a portion extending downwardly from said top wall and supporting said rear wall.

9. A card connector comprising:
   an insulative housing defining a bottom plate;
   a metallic shell fastened to the housing and defining a top wall to cooperate with bottom plate of the housing to define a card receiving space therebetween in a vertical direction;
   a plurality of contacts disposed in the housing with contact portions extending into the card receiving space;
   an ejecting mechanism assembled to the housing and including a slider moveable along a front-to-back direction between front and rear positions, and a spring urging said slider forwardly toward said front position; wherein
   a bent tab extending from the shell and defining an abutment section to stop the further forward movement of the slider when said slider is moved to said front position.

* * * * *